United States Patent
Boutin et al.

(10) Patent No.: US 10,539,670 B2
(45) Date of Patent: Jan. 21, 2020

(54) SYSTEM AND METHOD FOR CONTINUOUS WAVE INTERFERENCE CANCELLATION

(71) Applicant: Veoneer US, Inc., Southfield, MI (US)

(72) Inventors: Alain Boutin, Londonderry, NH (US); Xueru Ding, Newton, MA (US)

(73) Assignee: Veoneer US, Inc., Southfield, MI (US)

( * ) Notice: Subject to any disclaimer, the term of this patent is extended or adjusted under 35 U.S.C. 154(b) by 383 days.

(21) Appl. No.: 15/619,506

(22) Filed: Jun. 11, 2017

(65) Prior Publication Data

US 2017/0343662 A1 Nov. 30, 2017

Related U.S. Application Data

(63) Continuation-in-part of application No. 15/583,268, filed on May 1, 2017, which is a continuation of application No. 14/162,085, filed on Jan. 23, 2014, now Pat. No. 9,638,794.

(51) Int. Cl.
 *G01S 13/44* (2006.01)
 *G01S 7/03* (2006.01)
 *G01S 7/288* (2006.01)

(52) U.S. Cl.
 CPC .......... *G01S 13/4454* (2013.01); *G01S 7/038* (2013.01); *G01S 2007/2886* (2013.01)

(58) Field of Classification Search
 CPC .............. G01S 13/4454; G01S 13/931; G01S 2007/2886; G01S 7/023; G01S 7/038
 USPC ........................................................ 342/174
 See application file for complete search history.

(56) References Cited

U.S. PATENT DOCUMENTS

| | | |
|---|---|---|
| 5,625,362 A | 4/1997 | Richardson |
| 5,677,695 A | 10/1997 | Suzuki et al. |
| 5,969,667 A | 10/1999 | Farmer et al. |
| 7,439,905 B2 | 10/2008 | Honda et al. |
| 9,638,794 B2 | 5/2017 | Ding |
| 2003/0085834 A1 | 5/2003 | Okamura |
| 2007/0182619 A1 | 8/2007 | Honda et al. |
| 2011/0025546 A1 | 2/2011 | Cook et al. |
| 2016/0238694 A1* | 8/2016 | Kishigami ............. G01S 7/023 |

FOREIGN PATENT DOCUMENTS

| | | |
|---|---|---|
| EP | 2439552 | 11/2012 |
| JP | 05240947 | 9/1993 |

* cited by examiner

*Primary Examiner* — Timothy A Brainard
(74) *Attorney, Agent, or Firm* — Burns & Levinson, LLP; Steven M. Mills

(57) ABSTRACT

Methods and systems for cancelling continuous wave interference in radar systems include defining an integration time period, dividing the integration time period into sub-periods during which the radar sensor system transmits a radar signal integrating a detected signal during both sub-periods to generate sub-period integrated values, wherein integration in the sub-periods is triggered at points of symmetrical opposite polarities of a down converted interferer signal having a non-integer number of cycles in each sub-period, and adding tire respective sub-period integrated values to cancel interference residue of opposite polarity in the respective sub-periods.

20 Claims, 17 Drawing Sheets

SYSTEM AND METHOD FOR CONTINUOUS WAVE INTERFERENCE CANCELLATION

RELATED APPLICATIONS

This application is a continuation-in-part of U.S. application Ser. No. 15/583,268 filed May 1, 2017, entitled "Systems and Methods for Correcting for Leakage and Distortion in Radar Systems", which is a continuation of application of U.S. application Ser. No. 14/162,085, filed Jan. 23, 2014, title "Systems and Methods for Correcting for Leakage and Distortion in Radar Systems," now U.S. Pat. No. 9,638,794, each of which is incorporated by reference herein in their entirety for all purposes.

TECHNICAL FIELD

The present disclosure relates generally to the field of radar systems. More particularly, this disclosure relates to cancellation of continuous wave (CW) interference in radar systems.

BACKGROUND

As the number of cars equipped with anti-collision radar on the road increases, the chances of radar interference from other radar systems increases proportionally. This may lead to radar sensor blinding and increasing risk of vehicle collisions.

SUMMARY

In one aspect, at least one embodiment described herein provides a method of cancelling continuous wave interference in radar systems by defining an integration time period, dividing the integration time period into sub-periods during which the radar sensor system transmits a radar signal, integrating a detected signal during both sub-periods to generate sub-period integrated values, wherein integration in the sub-periods is triggered at points of symmetrical opposite polarities of a down converted interferer signal having a non-integer number of cycles in each sub-period, and adding the respective sub-period integrated values to cancel interference residue of opposite polarity in the respective sub-periods.

Any of the aspects and/or embodiments described herein can include one or more of the following embodiments. In some embodiments, each integration time period is associated with a transmitted radar signal of a different frequency. In some embodiments, the detected signal is one of an in-phase (I) and quadrature (Q) signal of the radar sensor system.

Any of the aspects and/or embodiments described herein can include one or more of the following embodiments. In one aspect, the symmetrical opposite polarities comprise positive and negative zero crossings of the down converted interferer signal. In another aspect, the detected signal is down mixed to obtain the down mixed CW interfere signal. In some embodiments, the first integration sub-period and the second integration sub-period are of equal size. The integration during the first sub-period and the second sub-period ends after a predetermined amount of time.

In another aspect, the CW interferer signal has a frequency different than the carrier frequency, and the down converted interferer signal has a frequency that is the difference between the carrier frequency and the CW interferer signal frequency.

In another embodiment, the radar sensor system comprises an automotive radar system, and the CW interferer signal is transmitted from a second automotive radar system.

In another embodiment, the length of integration time in the respective sub-periods may be adjusted to a length of time equaling an integer number of down converted interferer signal cycles. The down converted interferer signal may comprise one of an in-phase (I) and quadrature (Q) signal of the radar sensor system.

In another aspect, a radar sensor system with continuous wave (CW) interference cancellation is disclosed, including a transmitter for emitting a transmission radar signal at a carrier frequency, a receiver configured to detect a signal including reflections of the emitted transmission radar signal and a CW interferer signal, and a controller and/or processor for processing signals associated with the radar sensor system. The controller and/or processor may be configured to define an integration time period, the radar sensor system being configured to integrate a detected signal during the integration time period, divide the integration time period into a first sub-period and a second sub-period, the radar sensor system transmitting the transmission radar signal during the first sub-period and the second sub-period of the integration time period, integrate the detected signal during both the first sub-period and the second sub-period to generate respective sub-period integrated values, wherein integration in the first sub-period and second sub-period is triggered at points of symmetrical opposite polarities of a down converted interferer signal based on the CW interferer signal and having a non-integer number of cycles in each sub-period, resulting in interference residue in each of the respective sub-periods, and add the first sub-period integrated value and the second sub-period integrated value to cancel the interference residue of opposite polarity in the respective sub-periods, so as to generate a corrected integrated value for the integration time period.

In some embodiments, the signal used in generating fee detected signal from the receiver is an intermediate frequency (IF) signal generated by the radar sensor system. In some embodiments, the controllable circuit is a controllable switch used to invert the polarity of the signal used in generating the detected signal. In some embodiments, the controllable switch is a double-pole, double-throw (DPDT) switch. In some embodiments, the detected signal is one of an in-phase (I) and quadrature (Q) signal of the radar sensor system.

BRIEF DESCRIPTION OF THE FIGURES

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

The details described and illustrated herein are by way of example and for purposes of illustrative description of the exemplary embodiments only and are presented in the case of providing what is believed to be the most useful and readily understood description of the principles and conceptual aspects of the disclosure. In this regard, no attempt is made to show structural details of the subject matter in more detail than is necessary for the fundamental understanding of the disclosure, the description taken with the drawings making apparent to those skilled in that how the several forms of the present disclosure may be embodied in practice. Further, like reference numbers and designations in the various drawings indicate like elements.

Figure 1A:
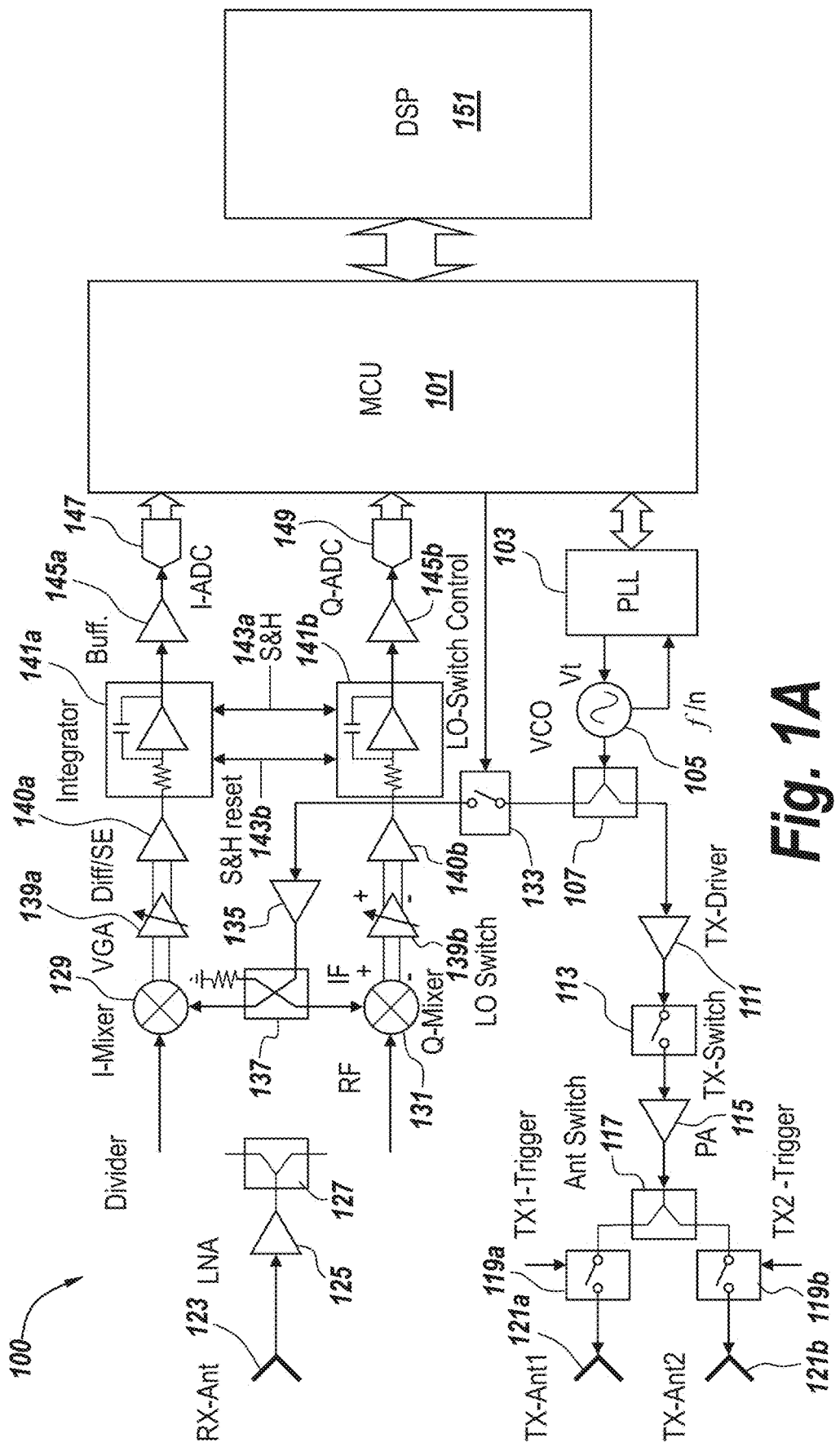
FIG. 1A is a schematic functional block diagram illustrating a radar system in accordance with various embodiments.

FIG. 1A illustrates an exemplary monopulse radar sensor (radar system) 100, the sensor having two transmitter channels and one receiver channel. Radar system 100 includes a microcontroller unit (MCU) 101 which controls a phase-locked loop (PLL) 103 which in turn transmits a signal to a voltage-controlled oscillator (VCO) 105, the output signal of which is then split at VCO power splitter 107. A portion of the output signal of the VCO 105 is routed to a transmitter driver 111 and, when a transmitter switch 113 is activated, the output signal is amplified by power amplifier 115, split by antenna power splitter 117, and, upon activation of respective trigger switches 119a, 119b, emitted by transmission frequency (TX) antennas 121a, 121b, respectively.

The transmitted signal is then reflected by a target and received by radio frequency (RX) antenna 123 as a radio frequency (RF) signal. The RF signal is then amplified using a low noise amplifier 125, divided by divider 127, and fed into T-mixer 129 for processing of the in-phase component of the received signal and Q-mixer 131 for processing the quadrature-phase component of the RF signal.

Additionally, a second portion of the output signal of the VCO 105 is routed through a local oscillator (LO) switch 133, driven by a LO driver 135, fed into a LO splitter 137, and fed into the I-mixer 129 and the Q-mixer 131. The I-mixer 129 and Q-mixer 131 then output intermediate frequency (IF) signals, which are each amplified in a variable gain amplifier 139a, 139b, converted from a differential signal to a single-ended signal in a differential-to-single-ended transformer 140a, 140b, and fed into an integrator 141a, 141b. The integrators 141a, 141b are operatively connected to a sample and hold 143a and a sample and hold reset 143b for sampling the signal. The outputs of the integrators 141a, 141b are fed into a buffer circuit 145a, 145b and then converted from an analog signal to a digital signal using analog to digital converters (I-ADC 147, Q-ADC 149). The MCU 101 then provides the digital signal to the digital signal processor (DSP) 151 for subsequent processing.

A completed monopulse radar system can also have one transmitter channel and two receiver channels. Two detected signal TX/RX1 and TX/RX2 will be processed in a similar way as TX1/RX and TX2/RX as radar system 100.

Figure 1B:
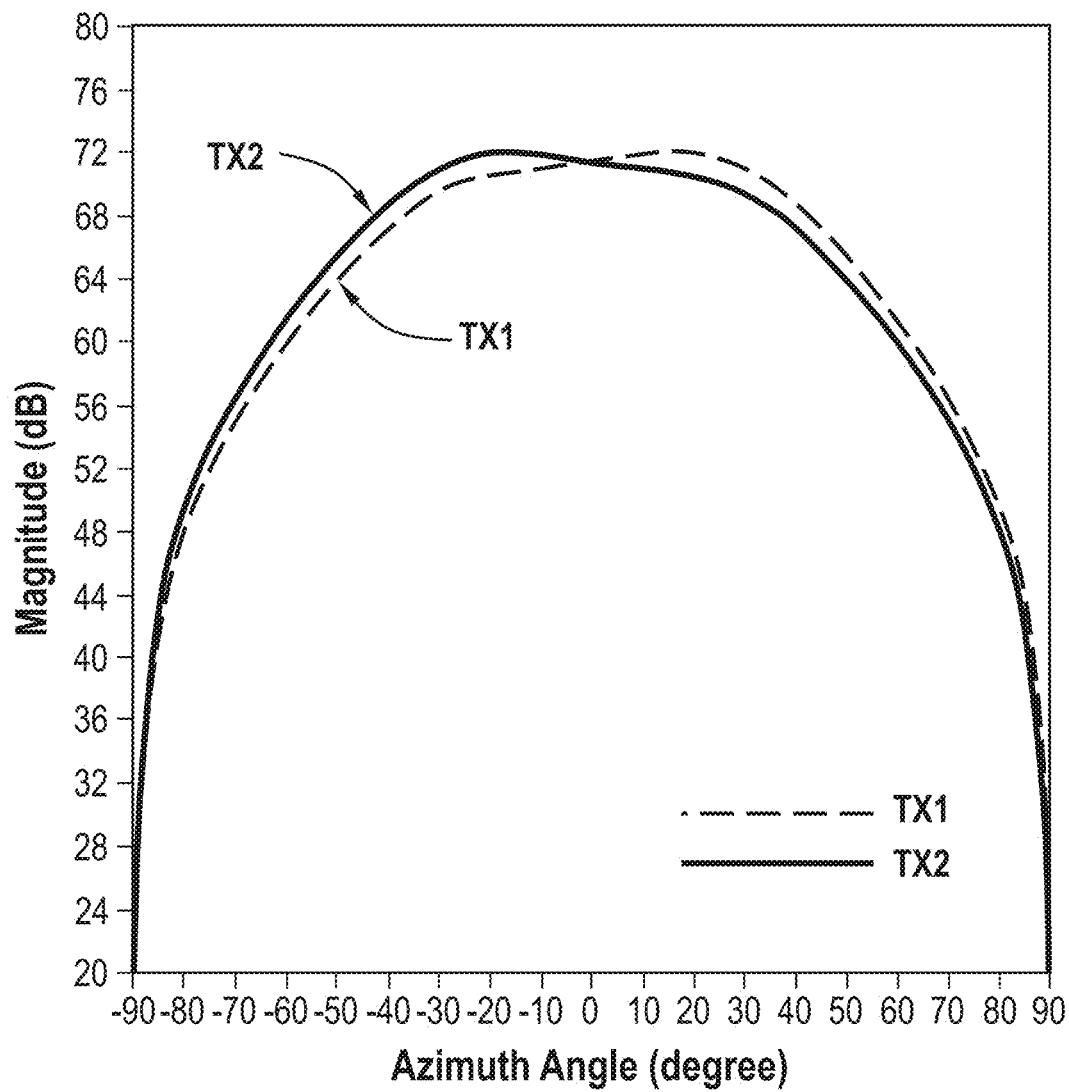
FIG. 1B is a graphical illustration of ideal magnitude versus azimuth angle antenna patterns for TX1 and TX2.
Figure 1C:
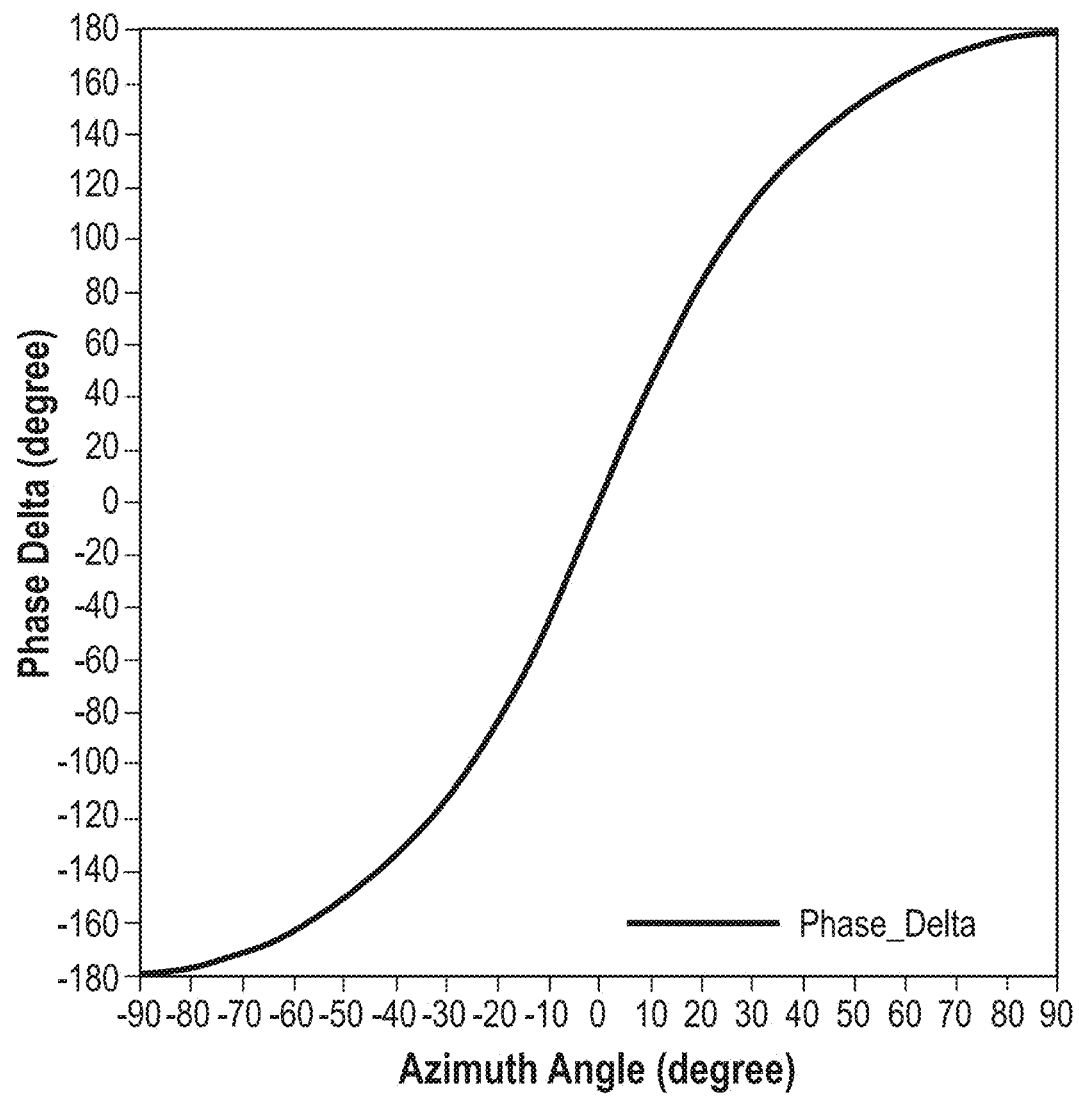
FIG. 1C is a graphical illustration of ideal phase difference versus azimuth angle for TX1/TX2.

FIG. 1B illustrates ideal magnitude versus azimuth angle patterns (two-way antenna patterns) for each TX antenna 121a, 121b. FIG. 1C illustrates an ideal phase difference (delta) versus azimuth angle curve, where the phase difference is the difference between the phase of a reflected signal received in response to transmissions from a first TX antenna (TX1) 121a and the phase of a reflected signal received in response to transmissions from a second TX antenna (TX2) 121b. However, due to hardware limitations and various leakage phenomena, actual measured results vary from these ideal curves.

Figure 2A:
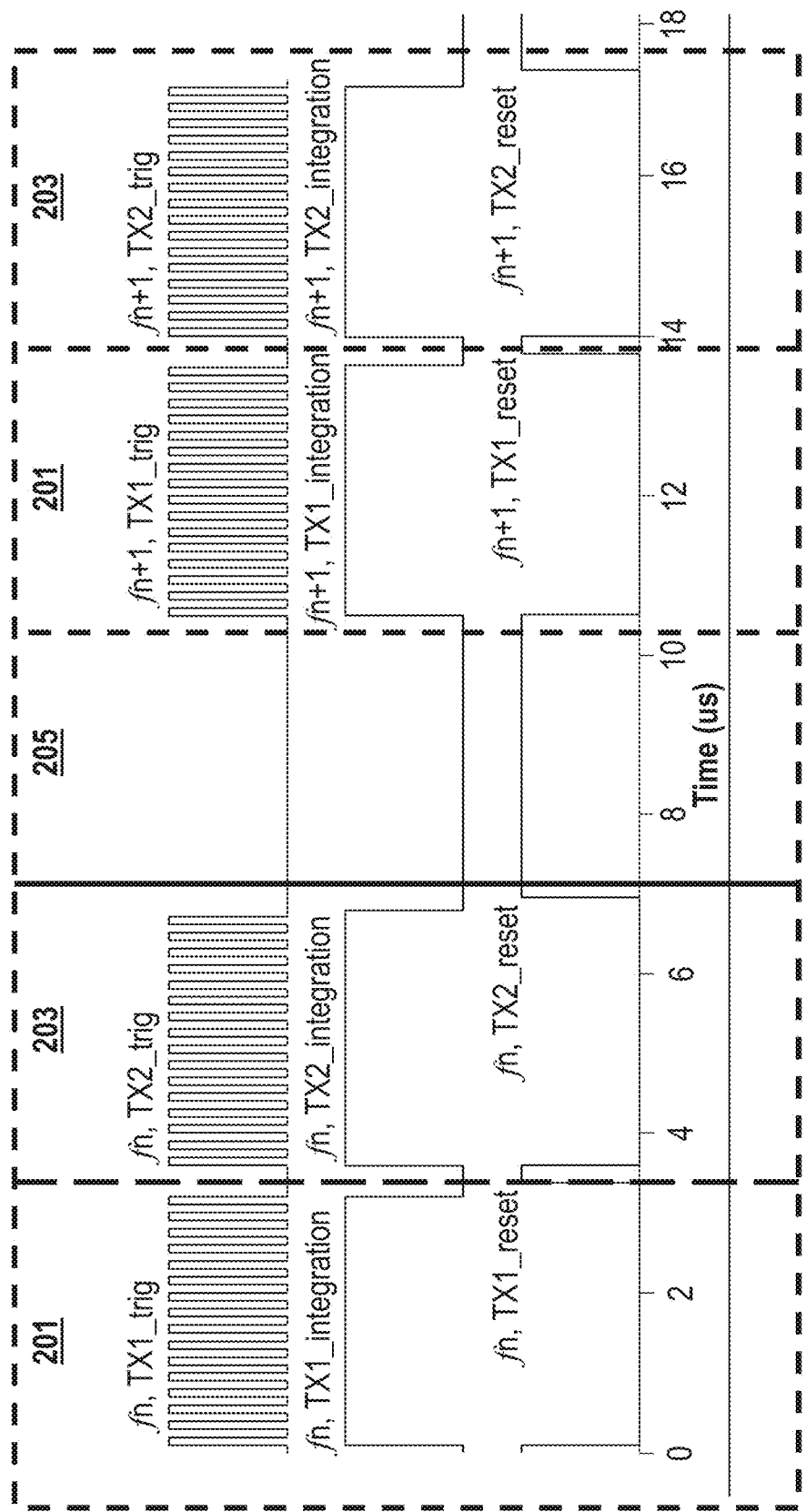
FIG. 2A is a graphical illustration of signal flows in the radar system of FIG. 1A, operated in accordance with the prior art.

FIG. 2A illustrates a conventional approach of the TX-control scheme for the two way signal detection to obtain the amplitude with TX1 121a and TX2 121b as well as the TX1/TX2 phase delta. In accordance with the conventional approach, TX-triggers 119a, 119b control, the radar transmission power ON and OFF, and logic 1 (high) means TX-ON, and 0 (low) means TX-OFF. The conventional approach integrates over a first integration period 201 where the TX1 trigger 119a is set to ON, the TX2 trigger 119b is set to OFF, and TX1 121a transmits a RF signal, and, then, during a second integration period 203, the TX1 trigger 119a is set to OFF, the TX2 trigger 119b is set to ON, and TX2 121b transmits a RF signal. The system 100 then calculates the TX1/TX2 phase difference during an inactive period 205 before looping to repeat the process.

For both the first integration period 201 and the second integration period 203, integrators 141a, 141b of the RX antenna 123 integrate for the entire designated integration time. Traditionally, this is assumed to be necessary because the leakage signal is present all the time. However, during a duty cycle of the main transmission signal, the leakage signal ends up with a higher integration gain than the main signal. Therefore, the unwanted leakage signal is enhanced and makes the distortion of the expected antenna patterns and the TX1/TX2 phase difference curve much worse, as described below with reference to FIGS. 2B-2D.

Figure 2B:
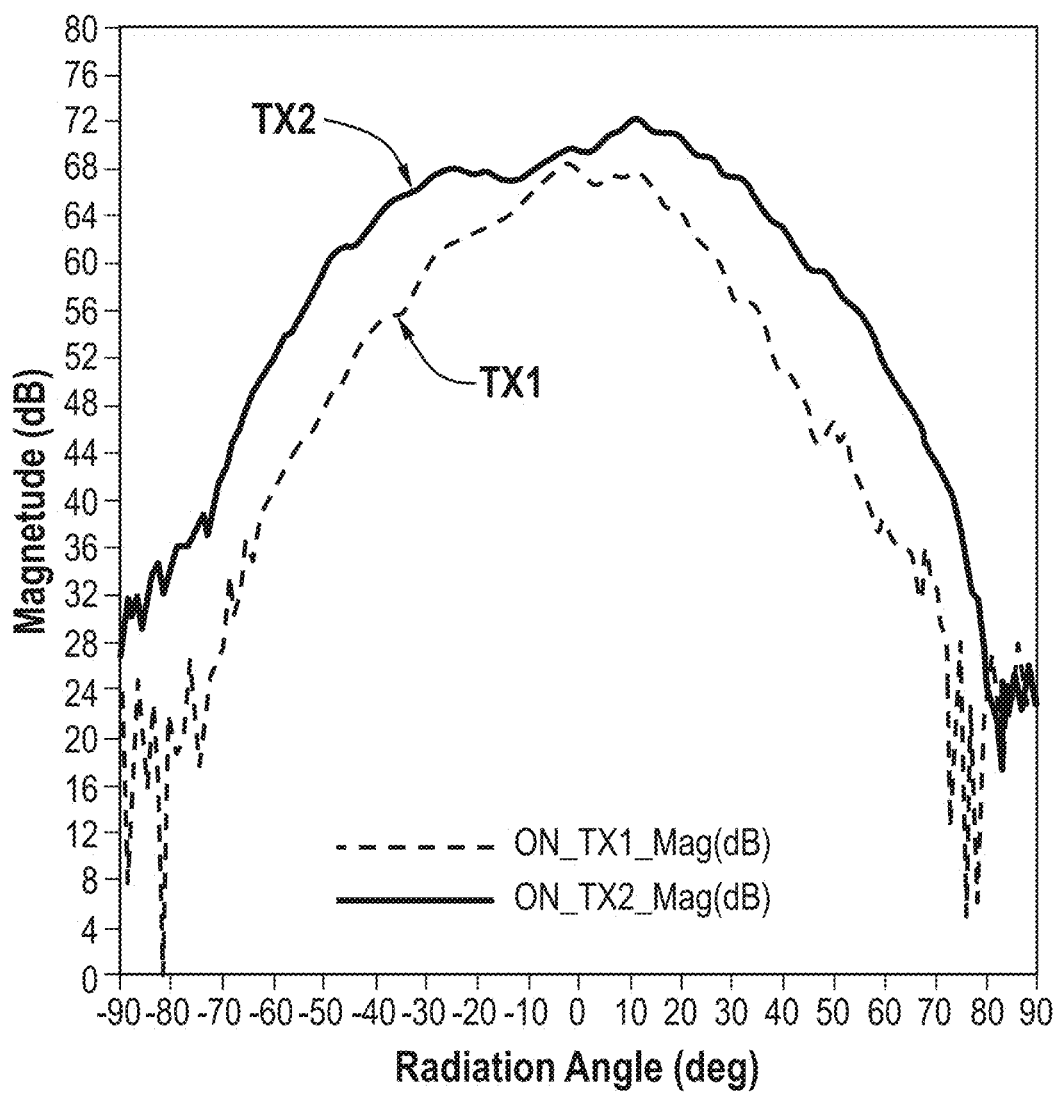
FIG. 2B is a graphical illustration of measured magnitude versus radiation angle antenna patterns for TX1 and TX2 in accordance with the prior art operation of FIG. 2A.
Figure 2C:
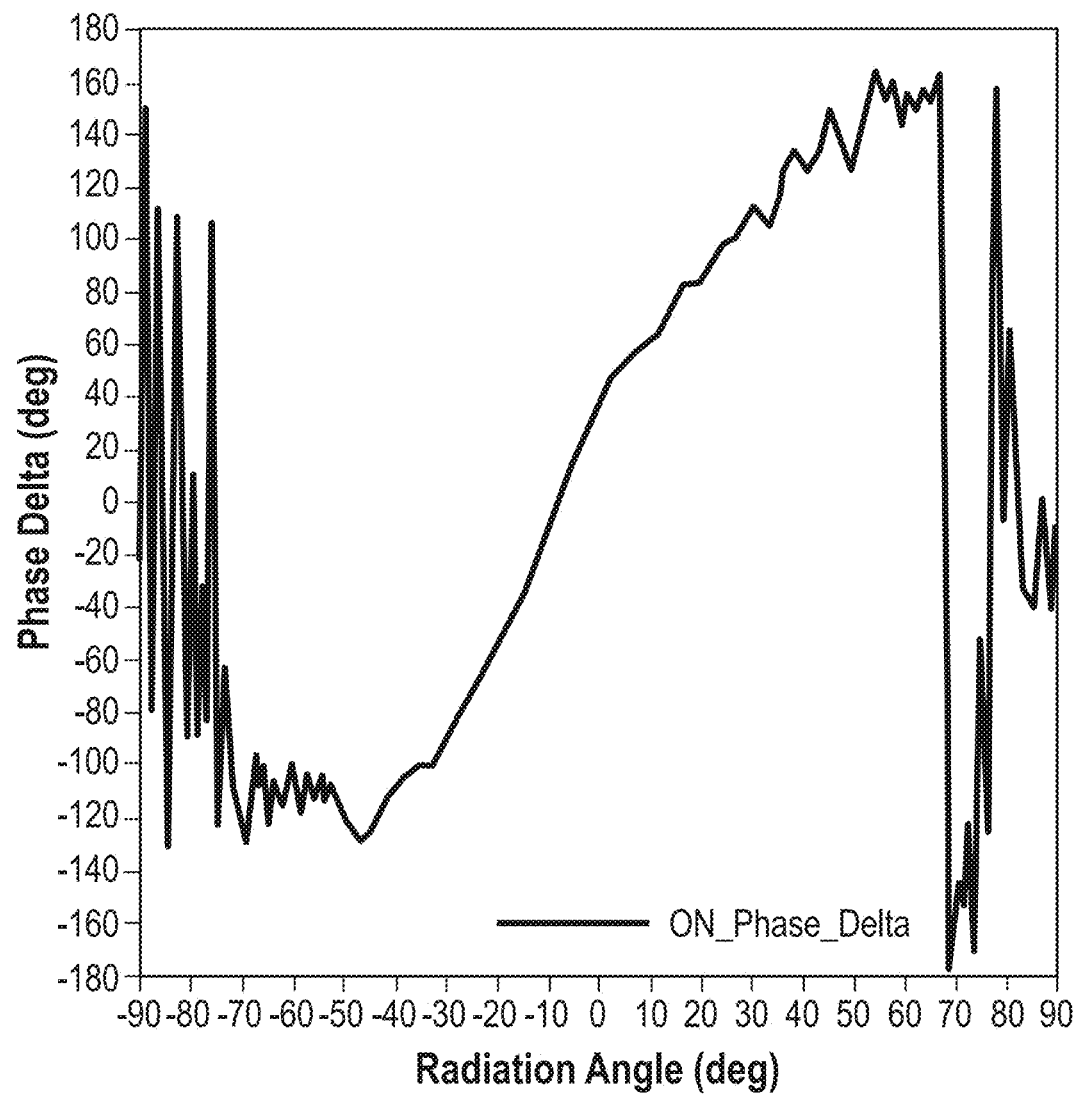
FIG. 2C is a graphical illustration of measured phase difference versus radiation angle for TX1/TX2 in accordance with the prior art operation of FIG. 2A.

FIGS. 2B-2C illustrate the measured antenna patterns of TX1 121a and TX2 121b as well as the TX1/TX2 phase delta curve of the radar system 100 of FIG. 1A as measured by the conventional approach. As shown in FIG. 2B, the 2-way TX1 121a and TX2 121b antenna patterns are very different from each ether in amplitude. For example, the amplitude difference for the radiation angle beyond +/−45 degree reaches over 12-dB. The majority of the differences between measured amplitudes of TX1 121a and measured amplitudes of TX2 121b are caused by differing leakage levels, especially the difference in leakage signal phase distributions when TX1 121a and/or TX2 121b is ON.

Figure 2D:
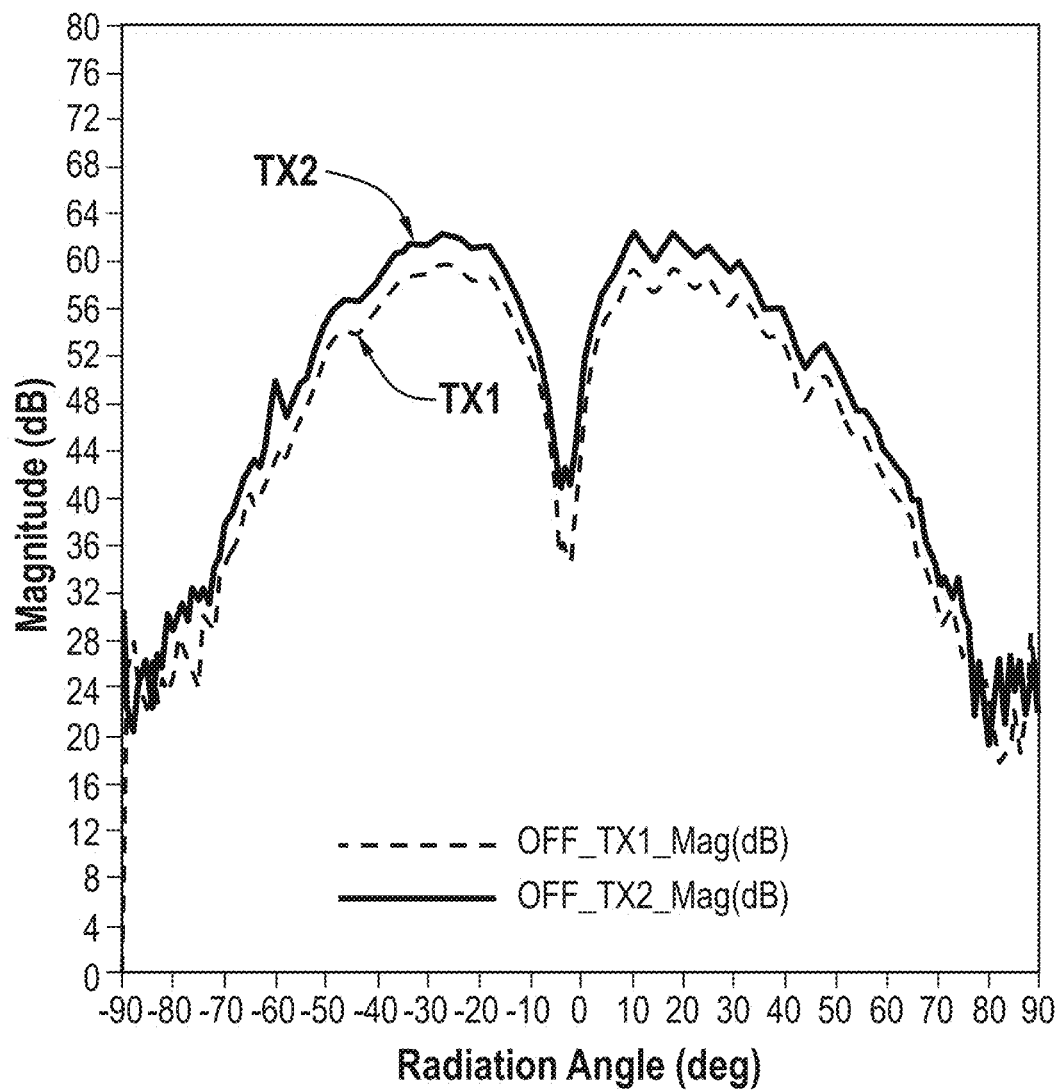
FIG. 2D is a graphical illustration of measured leakage values, i.e., magnitude measured with both TX1 and TX2 off, versus radiation angle for TX1 and TX2.

FIG. 2D illustrates the measured two-way leakage patterns of the radar system 100. Comparing the data shown in FIG. 2D with the data shown in FIG. 2B, it is apparent that the leakage level is high relative to the measured magnitude and, for some azimuth angles, e.g. beyond +/−30 degrees, the leakage magnitude associated with TX2 121b is higher than the measured magnitude of the radiation pattern of TX1 121a.

As shown in FIG. 2C the TX1/TX2 phase delta curve for azimuth angle less than −30 degrees exhibits flatness and for azimuth angle greater than +30 degrees exhibits ripple and phase wrapping. These distortions are primarily due to the presence of the unwanted leakage signal. Because the TX1/TX2 phase delta curve is widely used to detect target bearing information, such distortion of the phase delta curve results in radar target report errors, in some cases to the point of impairing basic radar functions.

Described herein are devices and techniques for correcting leakage and/or distortion in radar systems implemented by way of software solutions and by way of circuitry hardware solutions.

Exemplary Embodiments

Figure 3A:
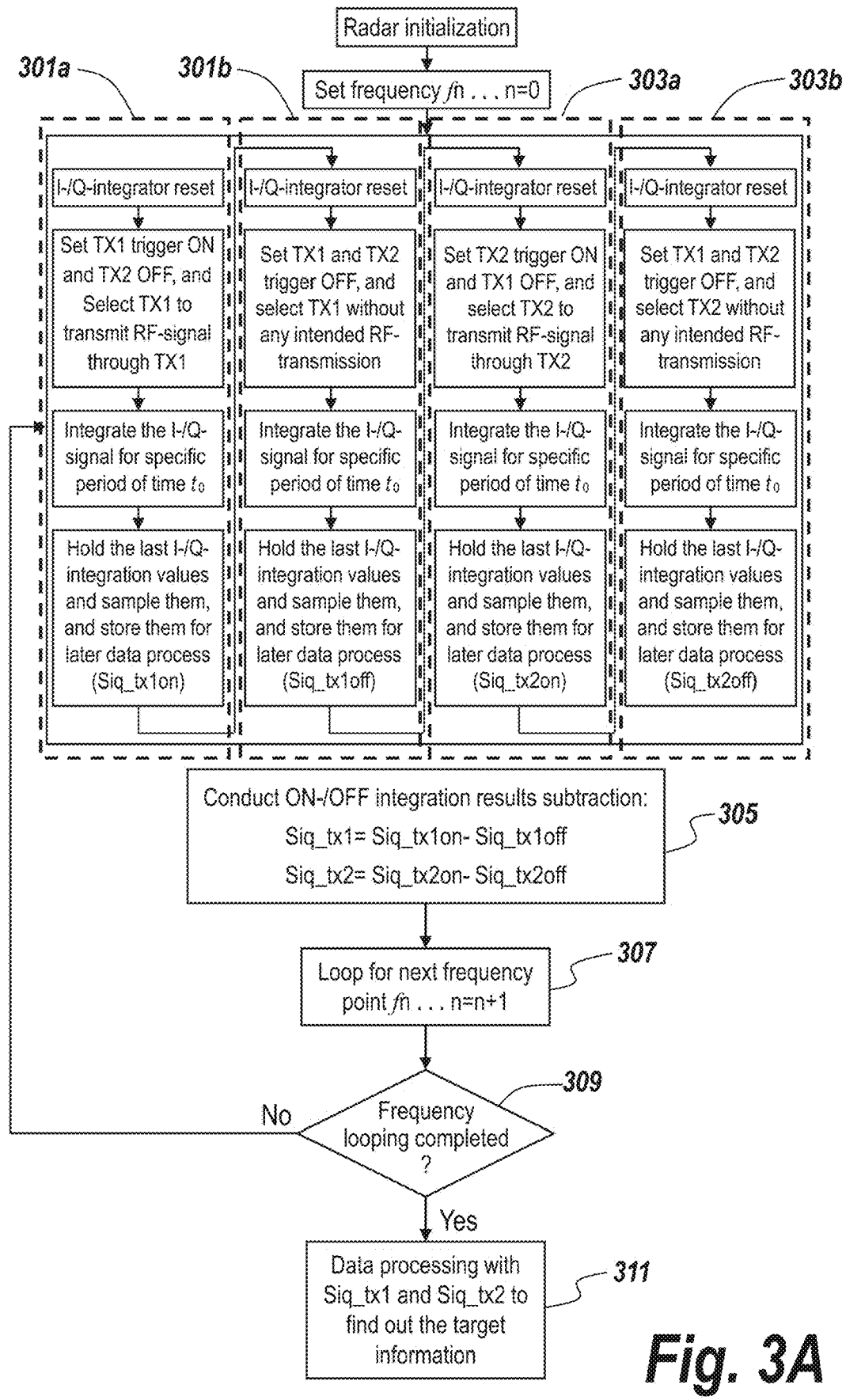
FIG. 3A is a logical flow diagram illustrating a logical flow of a method for correcting leakage and/or distortion in accordance with various embodiments.
Figure 3B:
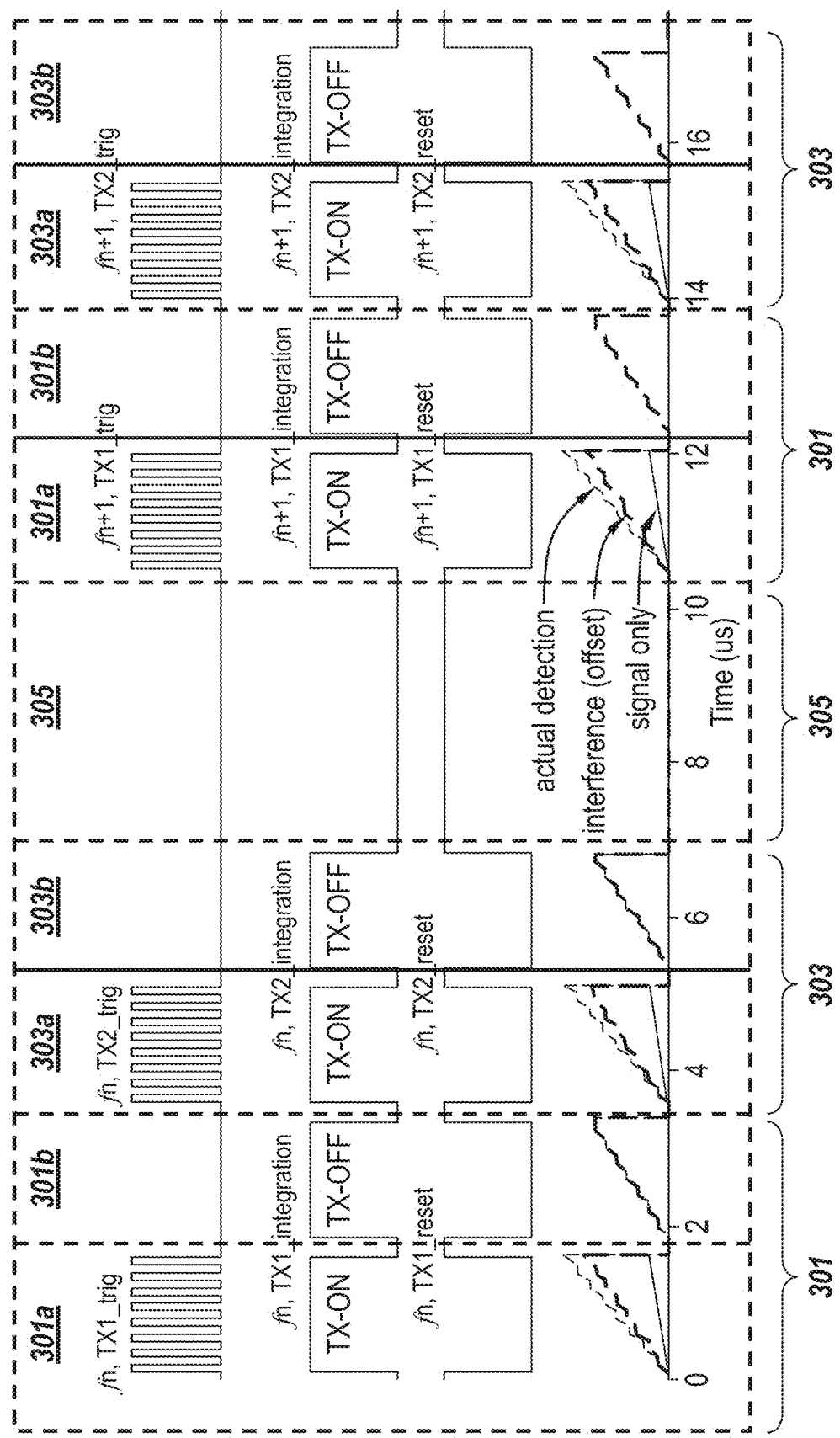
FIG. 3B is a graphical illustration of the signal flows in the radar system of FIG. 1A operated according to the method of FIG. 3A in accordance with various embodiments.

FIGS. 3A-3B illustrate an approach of the TX-control scheme for the corrected two way signal detection to obtain the amplitude with TX1 121a and TX2 121b as well as the TX1/TX2 phase delta curve according to some exemplary embodiments. In accordance with this approach, TX-triggers 119a, 119b control the radar transmission power ON and OFF, and logic 1 (high) means TX-ON, and 0 (low) for TX-OFF. The software approach integrates over a subdivided first integration period 301 where the TX1 trigger 119a is set to ON for a TX1 ON sub-period 301a while the TX2 trigger 119b is set to OFF and TX1 121a transmits a RF signal. The TX1 trigger 119a is then set to OFF for a TX1-OFF sub-period 301b while the TX2 trigger 119b remains OFF so that both TX1 121a and TX2 121b are off and neither transmits a RF signal.

Then, the approach integrates over a subdivided second integration period 303 where the TX2 trigger 119b is set to ON for a TX2-ON sub-period 303a while the TX1 trigger 119a remains OFF, and TX2 121b transmits a RF signal. The TX2 trigger 119a is then set to OFF tor a TX2-OFF sub-period 303b while the TX1 trigger 119a remains OFF so that both TX1 121a and TX2 121b are off and neither transmits a RF signal.

The system 100 then calculates the TX1/TX2 phase difference during an inactive period 305 before looping 307, 309 to repeat the process. After each frequency point has been integrated, the results are then provided to the digital signal processor 151 for subsequent processing.

Because each integration period, e.g., first integration period 301 or second integration period 303, is divided into two equal-length sub-periods with the first sub-period TX-ON 301a, 303a and the second sub-period TX-OFF 301b, 303b the integrations of the detected signal and/or interference cars be done separately for those two sub-periods. The integration results from the TX-OFF 301b, 303b sub-period (labeled "interference (offset)" in FIG. 3B) are then subtracted from the TX-ON 301a, 303a sub-period integration results (labeled "actual detection" in FIG. 3B) in the data processing from a digital signal processor embedded in the radar, e.g. DSP 151 as shown in FIG. 1A. This subtraction produces clean, signal-only results (labeled "signal only" in FIG. 3B).

Figure 4A:
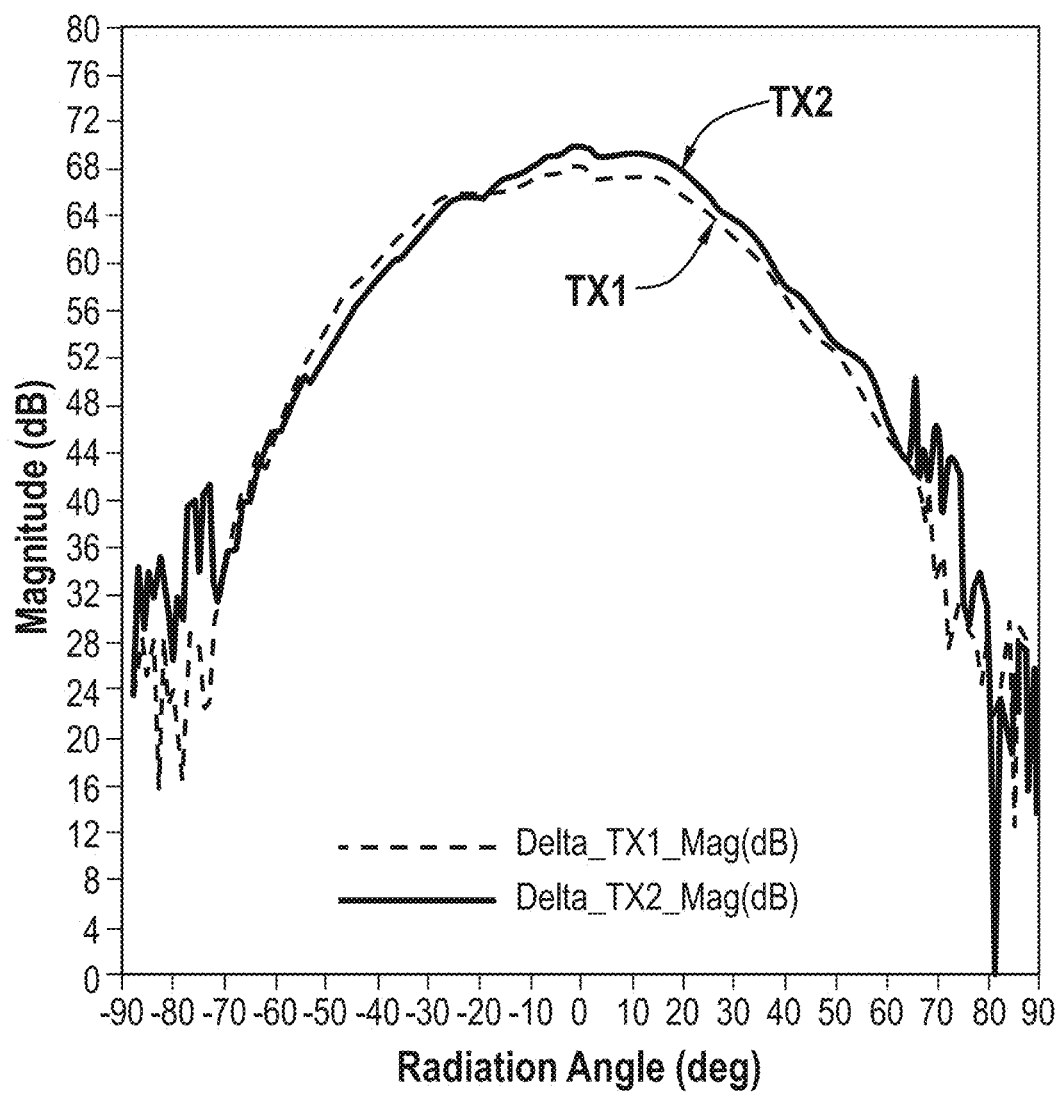
FIG. 4A is a graphical illustration of subtracted magnitude versus azimuth angle antenna patterns for TX1 and TX2 in accordance with various embodiments.

As described in FIG. 3A, the amplitude subtraction results, e.g., as shown in FIG. 4A, for each integration period 301, 303 are actually determined by subtracting the results as sampled and held (stored) by the sample and hold 143a and the sample and hold reset 143b at the last point of each integration sub-period 301a, 301b, 303a, 303b. Therefore, the results tor the first integration period 301 are determined by subtracting the amplitude of the last point of the TX1-OFF sub-period 301b from the amplitude of the last point of the TX1-ON sub-period 301a.

Comparing the antenna patterns of TX1 121a and TX2 121b of the exemplary embodiments described in connection with FIGS. 3A and 3B (see FIG. 4A) with the conventional approach antenna patterns (see FIG. 2B), it is clear that the approach of the exemplary embodiments described in connection with FIGS. 3A and 3B more closely mirrors the ideal magnitude versus azimuth angle patterns (two-way antenna patterns) shown in FIG. 1B. Additionally, the 2-way TX1 121a and TX2 121b antenna patterns are much closer to each other in amplitude because the leakage and interference have been cancelled.

Figure 4B:
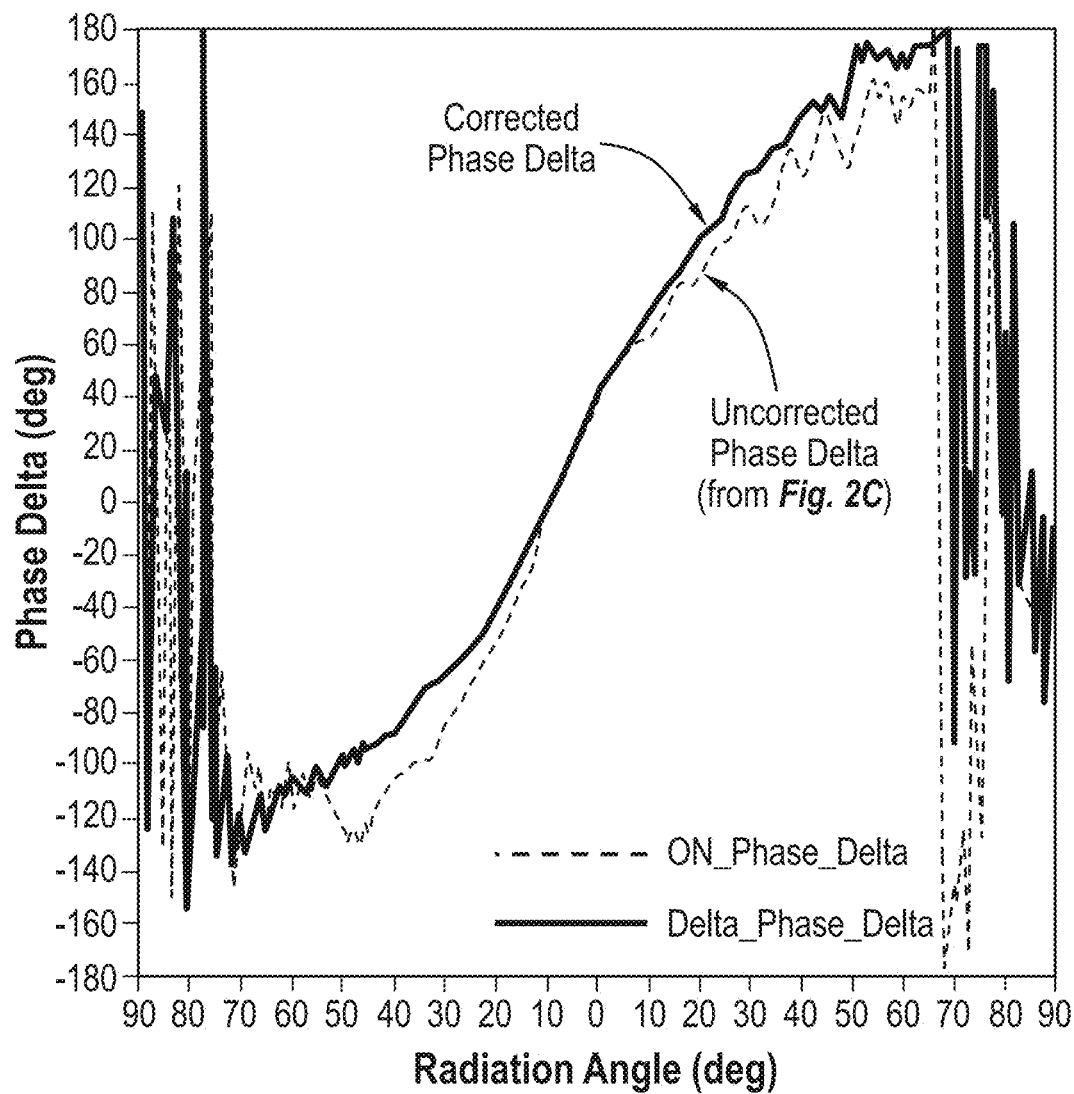
FIG. 4B is a graphical illustration showing the subtracted phase difference versus azimuth angle for TX1/TX2 in accordance with various embodiments as compared to the prior art results of FIG. 2C.

Comparing the TX1/TX2 phase delta curve of the exemplary embodiments described in connection with FIGS. 3A and 3B (see "corrected phase delta" of FIG. 4B) with the conventional approach TX1/TX2 phase delta curve (see FIG. 2C or "uncorrected phase delta" of FIG. 4B), it is clear that the approach of the exemplary embodiments described in connection with FIGS. 3A and 3B more closely mirrors the ideal phase difference (delta) versus azimuth angle curve shown in FIG. 1C. Additionally, the prominent ripple and phase wrapping of the conventional approach have been significantly reduced by the approach of the exemplary embodiments described in connection with FIGS. 3A and 3B. Therefore, detected target bearing information is more accurate, reducing radar target report errors and preventing impairment of basic radar functions. Advantageously, the approach of the exemplary embodiments described in connection with FIGS. 3A and 3B can be implemented without changing any pre existing circuitry hardware in the radar system.

According to other exemplary embodiments, a pair double-pole double throw (DPDT) switch can, in accordance with various embodiments, be added in the differential IF-chain of the receiver I-/Q-circuits. These DPDTs can be arranged anywhere between the differential I-/Q-mixer outputs and the inputs of the differential-to-single-ended transformer circuit. In these embodiments there is no sample-and-hold reset required between the TX-ON and TX-OFF as in the exemplary embodiments described in connection with FIGS. 3A and 3B. Instead, an IF-polarity control signal is used to switch I/Q-signal polarities and a combined integration process is used for both the TX-ON and TX-OFF states.

Figure 5A:
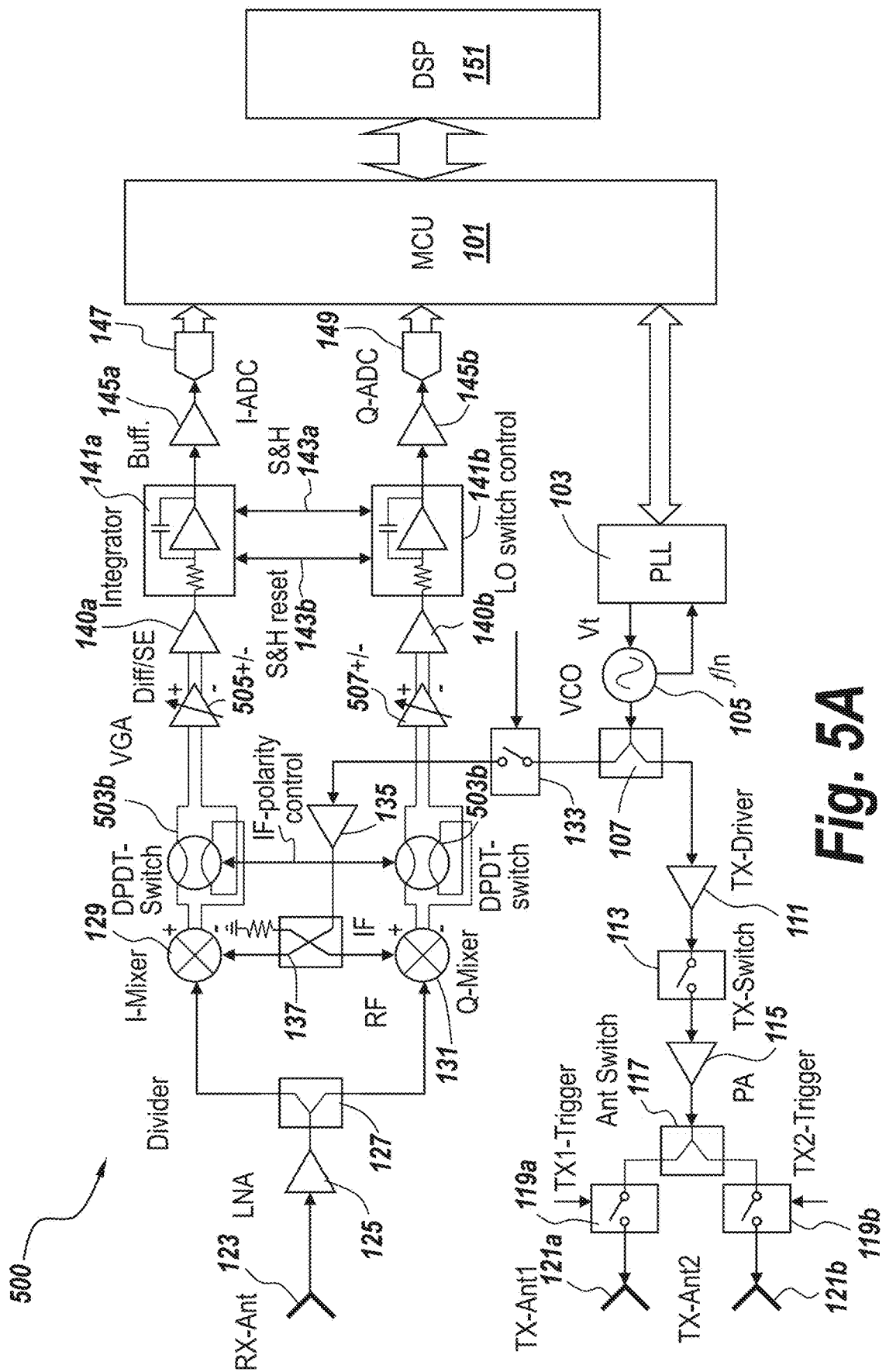
FIG. 5A is a schematic functional block diagram illustrating another radar system in accordance with various embodiments.

FIG. 5A illustrates a modified radar system with a single ended IF-chain 500 for correcting leakage and/or distortion in radar systems such as the monopulse radar sensor (radar system) 100 shown in FIG. 1A, according to these latter exemplary embodiments. As shown in FIG. 5A, radar systems with a single ended IF-chain 500 can, in accordance with various embodiments, be implemented by removing the variable gain amplifiers 139a, 139b of the radar system 100 and replacing them with a single-ended double-pole double-throw (DPDT) circuit. The single-ended DPDT circuit, in accordance with various embodiments, can include DPDT switch pairs 503a, 503b configured to receive the output IF signals from the I-mixer 129 and the Q-mixer 131 and variable gain amplifier pairs 505+/−, 507+/− configured to receive positive and negative outputs from the DPDT switch pairs 503a, 503b and output to the differential-to-single-ended transformers 140a, 140b, which feed into the integrators 141a, 141b.

Figure 5B:
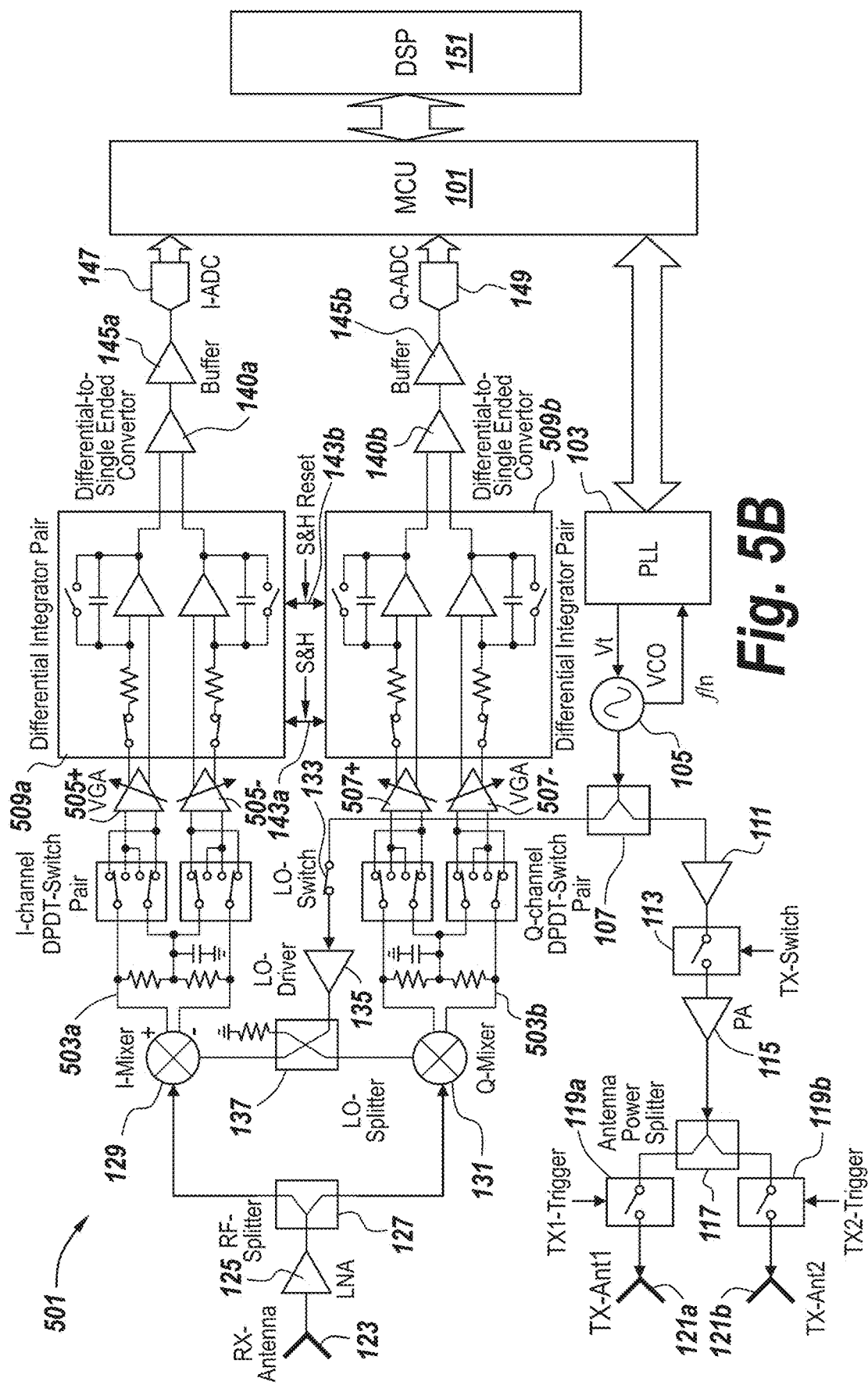
FIG. 5B is a schematic functional block diagram illustrating still another radar system in accordance with various embodiments.

FIG. 5B illustrates a radar system with a differential IF-chain 501 for correcting leakage and/or distortion in radar systems such as the monopulse radar sensor (radar system) 100 shown in FIG. 1A, according to these latter embodiments. As shown in FIG. 5B, modified radar systems 501 can, in accordance with various embodiments, be implemented by removing the variable gain amplifiers 139a, 139b and the integrators 141a, 141b of the radar system 100 and replacing them with a differential double-pole double-throw (DPDT) circuit. As shown in FIG. 5B, the differential DPDT circuit, in accordance with various embodiments, can include DPDT switch pairs 503a, 503b configured to receive the output IF signals from the I-mixer 129 and the Q-mixer 131, variable gain amplifier pairs 505+, 505−, 507+, 507− configured to receive positive and negative outputs from the DPDT switch pairs 503a, 503b, and differential integrator pairs 509a, 509b configured to receive outputs from the variable gain amplifier pairs 505+, 505−, 507+, 507− and output to the differential-to-single-ended transformers 140a, 140b, which feed into the buffer circuits 145a, 145b.

Figure 5C:
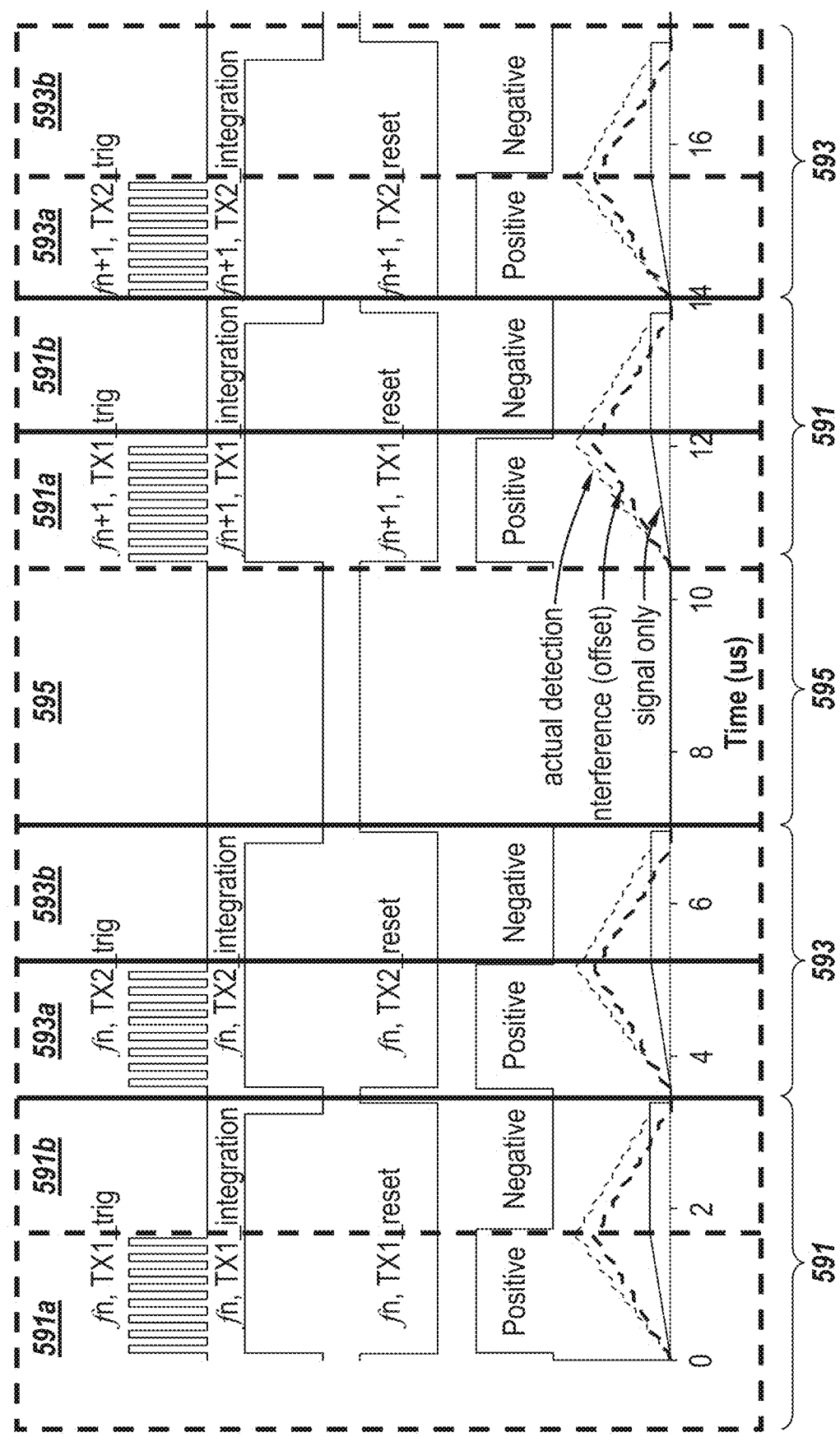
FIG. 5C is a graphical illustration of signal flows in a radar system such as the radar systems of FIGS. 5A and 5B in accordance with various embodiments.

FIG. 5C illustrates an approach of the TX-control scheme for the corrected two way signal detection to obtain the amplitude with TX1 121a and TX2 121b as well as the TX1/TX2 phase delta curve according to the exemplary embodiments described in connection with FIGS. 5A and 5B. In accordance with these exemplary embodiments, TX-triggers 119a, 119b control the radar transmission power ON and OFF, and logic 1 (high) means TX-ON, and 0 (low) means TX-OFF. The approach of the exemplary embodiments described in connection with FIGS. 5A and 5B integrates over a subdivided first integration period 591 where, for a TX1-POS sub-period 591a the TX1 trigger 119a is set to ON, the DPDT switch pairs 503a, 503b are set to positive polarity, the TX2 trigger 119b is set to OFF, and TX1 121a transmits a RF signal. Then, for a TX1-NEG sub-period 591b, the TX1 trigger 119a is set to OFF and the DPDT switch pairs 503a, 503b are switched to negative polarity while the TX2 trigger 119b remains OFF so that both TX1 121a and TX2 121b are off and neither transmits a RF signal.

Then, the approach of the exemplary embodiments described in connection with FIGS. 5A and 5B integrates over a subdivided second integration period 593 where, for a TX2-POS sub-period 593a the TX2 trigger 119b is set to ON, the DPDT switch pairs 503a, 503b are set to positive polarity, the TX1 trigger 119a is set to OFF, and TX2 121b transmits a RF signal. Then, for a TX2-NEG sub-period 593b, the TX2 trigger 119b is set to OFF and the DPDT switch pairs 503a, 503b are switched to negative polarity while the TX1 trigger 119a remains OFF so that both TX1 121a and TX2 121b are off and neither transmits a RF signal.

The modified radar system 500, 501 then calculates the TX1/TX2 phase difference during an inactive period 595 before looping to repeat the process. After each frequency point has been integrated, the results are then provided to the digital signal processor 131 for subsequent processing.

As shown in FIG. 5C, by switching the I/Q signal polarity control, the interference (leakage signal) reverses direction, thereby causing the integrated I/Q signal output to go in a first direction, e.g., increasing magnitude as shown in FIG. 5C, during the TX1-POS 591a and TX2-POS 593a sub-periods, while the I/Q signal output goes in the opposite direction, e.g., decreasing magnitude as shown in FIG. 5C, during the TX1-NEG 591b and TX2-NEG 593b sub-periods. Because there is no sample and hold reset between the sub-periods, e.g., between TX1-POS 591a and TX1-NEG 591b, the peak I/Q signal output is a starting point for the negative polarity integration. Because no signal is transmitted during the negative polarity integration, the peak I/Q signal output is reduced only by the decreasing interference signal and the interference contribution to the integration output is cancelled out by the end of the integration cycle. Therefore, when the signal output is sampled at the end of the integration period 591, 593, the signal output is equal to the clean signal output. Therefore, results equivalent to those illustrated in FIGS. 4A-4B can be achieved through the approach of the exemplary embodiments described in connection with FIGS. 5A-5C. Advantageously, the exemplary embodiments described in connection with FIGS. 5A-5C described herein require no extra data processing to remove the leakage contribution. Additionally, in accordance with various embodiments, by integrating the DPDT circuitry of the exemplary embodiments described in connection with FIGS. 5A-5C into an application specific integrated circuit (ASIC) of the modified radar system 500, 501, increases in system production costs and data process complexity can be avoided.

In theory, reduction of the active transmission signal time by half could, without offsetting considerations, cause a significant and disadvantageous reduction in signal to noise ratio (SNR). However, because the overall transmitted RP-signal is decreased, the transmitted RF-power can be increased to meet the regulatory limit of the root mean square (rms) RF-power if no peak power violation is caused, thereby mitigating the reduction in SNR. Moreover, by subtracting or negating the leakage contribution, the exemplary embodiments described herein can also suppress the noise floor caused by the interference. Therefore, the actual signal SNR reduction caused by implementing the software solution will, in a worst case scenario, result in minimal SNR reduction and, in accordance with various embodiments, can increase SNR. Further advantageously, the exemplary embodiments described herein reduce the DC-offset of the IF-signal, which, in some cases, would otherwise paralyze the whole system. Also advantageously, the direct radar target bearing report accuracy is improved by the cancellation or reduction of the unwanted leakage, distortion, and/or other interference signal.

Figure 6A:
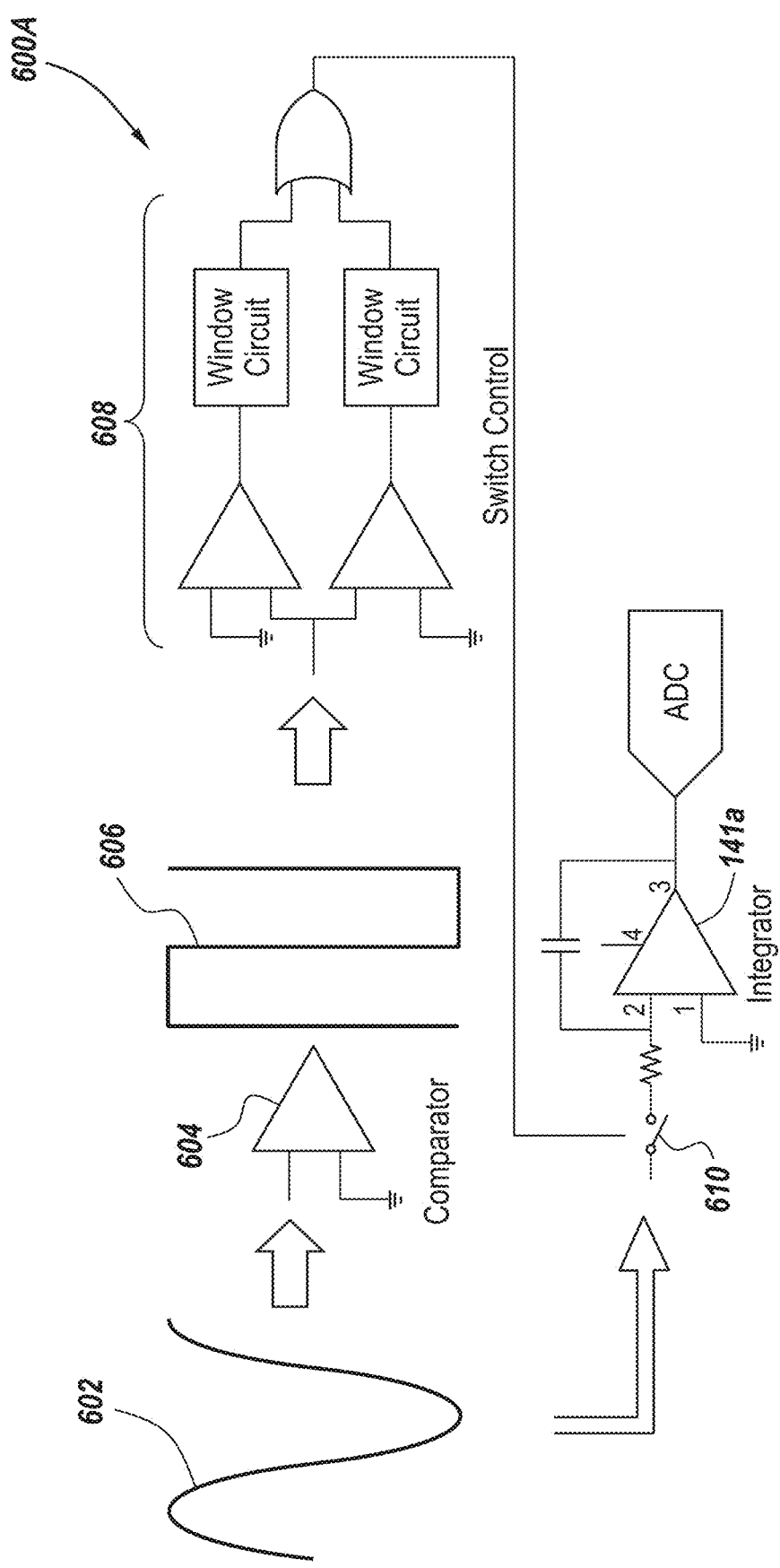
FIGS. 6A and 6B are schematic functional block diagrams illustration portions of another radar system in accordance with various embodiments.
Figure 6B:
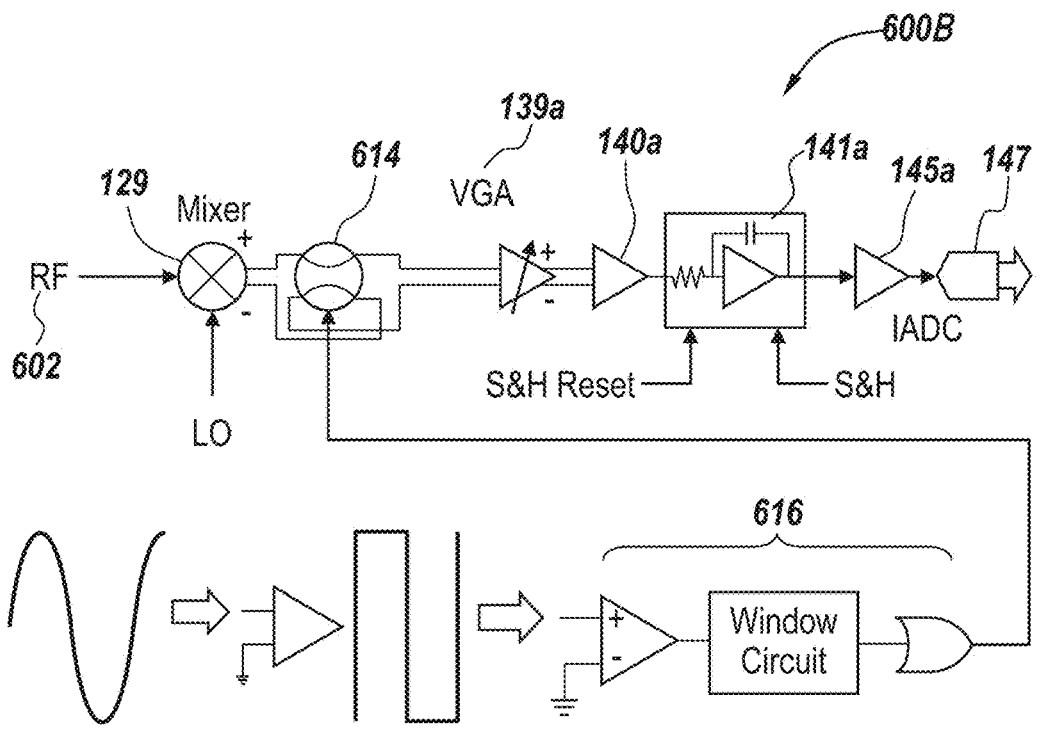

FIGS. 6A and 6B illustrate exemplary alternative functional sub-modules sub-circuits 600A and 600B that might be implemented in portions of an I or Q receiver channel such as shown in FIG. 5A in order to modify radar system 500 in order to enable cancellation of CW interference signals received at RF (RX) antenna 123. The function of like numbered components shown in the diagram is substantially as previously described.

As shown in FIG. 6A, the interferer signal 602 enters a comparator 604 and integrator 141a simultaneously. Comparator 606 translates the interferer's sinusoid into a square wave 606. Square wave 606 triggers window circuitry 608, which in turn closes a switch 610 at the input of integrator 141a, thus beginning the integration time for an integration window (as described below.) Window circuitry 608 times out after a precise amount of time, ending the integration window. After a first integration window completes, a negative edge of comparator 604 may be used to trigger the start of integration in a second integration window. FIG. 6B shows an alternate embodiment making use of a DPDT circuit that could also function to reduce leakage as previously described.

Figure 7:
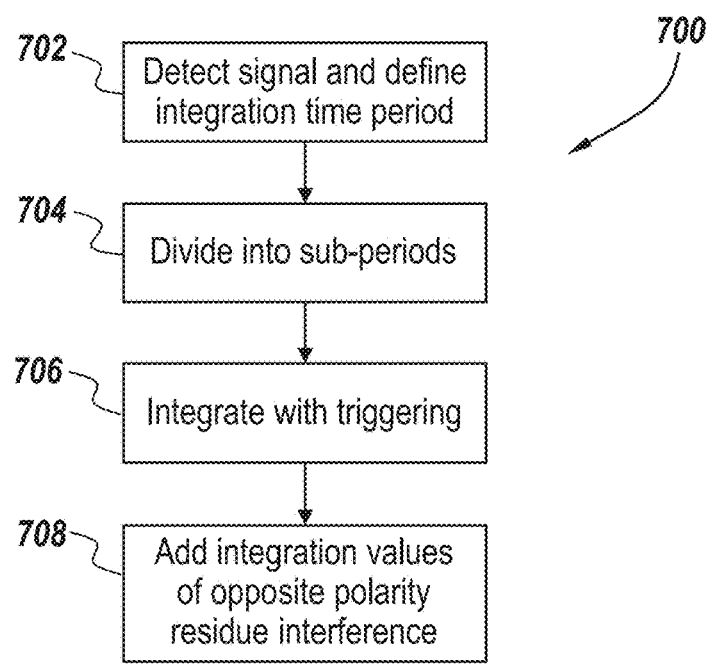
FIG. 7 is a flow diagram of a method for cancelling interference in accordance with an embodiment.
Figure 8:
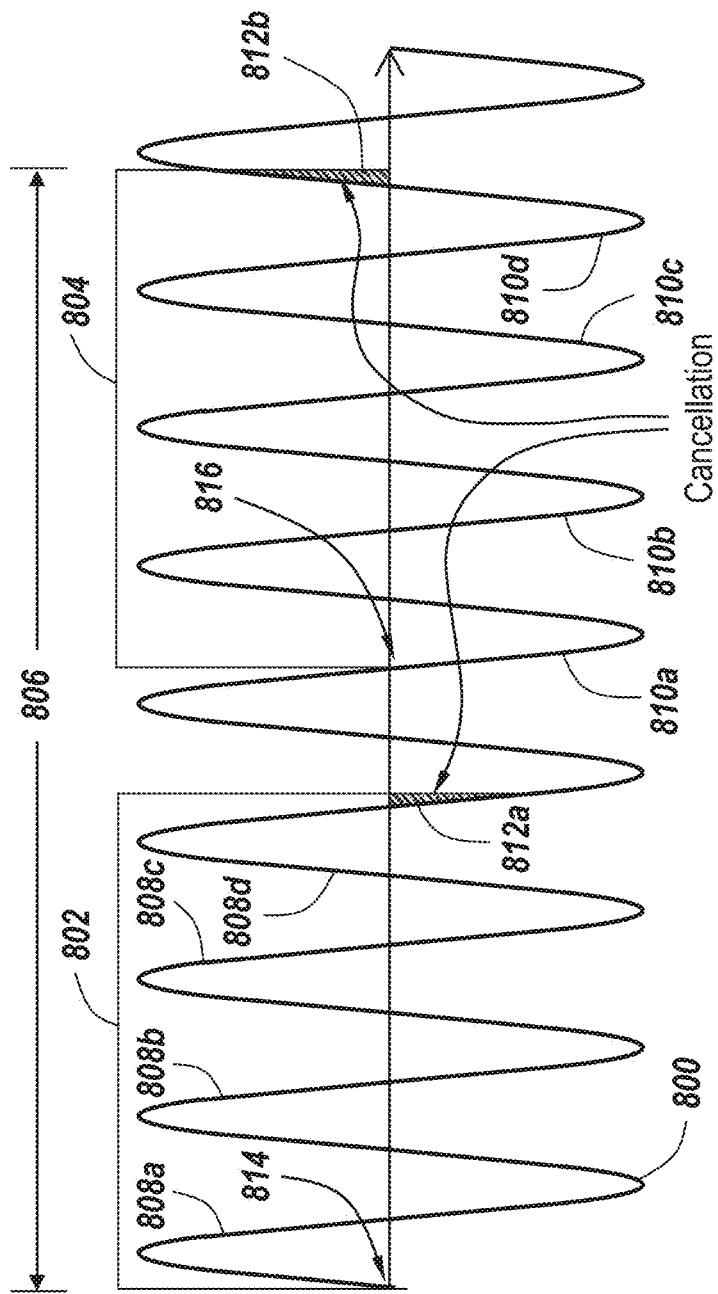
FIG. 8 is a chart showing an example down converted interferer signal processed by a radar system in accordance with an embodiment.

FIG. 7 shows a flow diagram of an example method 700 of cancelling continuous wave interference in a radar sensor system 500 modified as shown in FIG. 6A or 6B. FIG. 8 illustrates an example of a down mixed interferer signal 800 and a first integration sub-period 802 and a second integration sub-period 804 within an integration time period 806 that may facilitate understanding of the operation of the modified CW interference cancellation radar sensor system and method 700. As is known, a radar sensor (e.g., automotive sensor, etc.) transmits short bursts of CW RF signals at a given carrier frequency, and then listen (step 702) for an echo returned from surrounding targets during integration time period 806. The echo is contained in a signal 602 detected at an antenna such as RF (RX) antenna 123. Given the increasing number of radar systems employed on automotive vehicles, the detected signal 602 is likely to also include a CW signal emitted from an interferer, such as another automotive radar system. A controller and/or processor of modified radar sensor 500 may divide (step 704) the integration time period 806 into integration sub-periods 802, 804, during which time a transmitter of the modified radar sensor 500 is transmitting the transmission CW radar signals.

The detected signal 602 is mixed down at a base band frequency for integration (step 706) by integrator 141a during the sub-periods 802, 804 in order to generate respective sub-period integrated values. The down converted signal appears as a quasi-constant voltage level at the input of integrator 141a. In the presence of a CW interferer signal at some frequency offset from the radar carrier frequency, the down converted interferer appears as a CW interferer signal 800 in the down mixed detected signal whose frequency is the difference between the carrier frequency and the interferer's frequency. As a consequence, the equally sized, integration sub-periods 802,804 do not cover an integer number of interference cycles 808a-808d and 810a-810d. The result of this incongruity is that the remaining portions of the last cycle 808d, 810d in the respective sub-periods 802, 804 comprise interference residues 812a and 812b that would translate into noise after integration.

Method 700 makes advantageous use of the fact that residues 812a and 812b are of opposite polarity. In step 706, the controller and/or processor integrates in the sub-periods 802,804 by respectively triggering initiation of integration on the positive zero crossing 814 and negative zero crossing 816 of the down converted interferer signal 800. The triggering of sub-period integrations could occur at any pair of points along down converted interferer signal 800 that have symmetrical opposite polarities. Integration values for each of the sub-periods 802, 804 are obtained and then summed in step 708. Because the interference residue 812a, 812b are of opposite polarities, summation causes their values to cancel each other out, resulting in a corrected integrated value free from CW interference for the integration time period 806.

In an alternate embodiment, the lengths of integration times in sub-periods 802, 804 may be adjusted to be equal to an integer multiple of down converted interferer signal cycles, to avoid generation of interference residues 812a, 812b.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors and/or controllers executing a computer program to perform functions of the invention by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware, e.g., a controller such as a microcontroller, that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data, e.g., magnetic, magneto-optical disks, or optical disks.

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special, purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device, e.g., a mouse or a trackball, by which the user can provide input to the computer, e.g., interact with a user interface element. Other kinds of devices can be used to provide for interaction with a user. Other devices can, for example, be feedback provided to the user in any form of sensory feedback, e.g., visual feedback, auditory feedback, or tactile feedback. Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication, e.g., a communication network. Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network, e.g., local area network (LAN), wide area network (WAN), campus area network (CAN), metropolitan area network (MAN), home area network (HAN)), a private IP network, an IP private branch exchange (IPBX), a wireless network, e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network, e.g., RAN, Bluetooth, code-division multiple access (CDMA) network, time division multiple access (TDMA) network, global system for mobile communications (GSM) network, and/or other circuit-based networks.

The computing system can also include one or more computing devices. A computing device can include, for example, a computer, a computer with a browser device, a telephone, an IP phone, a mobile device, e.g., cellular phone, personal digital assistant (PDA) device, laptop computer, electronic mail device, and/or other communication devices. The browser device includes, for example, a computer, e.g., desktop computer, laptop computer, with a World Wide Web browser, e.g., Microsoft® Internet Explorer® available from Microsoft Corporation, Mozilla® Firefox available from Mozilla Corporation. The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present disclosure has been described with reference to example embodiments, it is understood that the words that have been used herein, are words of description and illustration, rather than words of limitation. Changes may be made, within the purview of the appended claims, as presently stated and as amended, without departing from the scope and spirit of the present disclosure in its aspects.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of cancelling continuous wave interference in a radar sensor system configured to transmit a transmission radar signal at a carrier frequency, comprising:
    defining an integration time period, the radar sensor system being configured to integrate a detected signal during the integration time period, the detected signal including a continuous wave (CW) interferer signal;
    dividing the integration time period into a first sub-period and a second sub-period, the radar sensor system transmitting the transmission radar signal during the first sub-period and the second sub-period of the integration time period;
    integrating the detected signal during both the first sub-period and the second sub-period to generate respective sub-period integrated values, wherein integration in the first sub-period and second sub-period is triggered at points of symmetrical opposite polarities of a down converted interferer signal based on the CW interferer signal and having a non-integer number of cycles in each sub-period, resulting in interference residue in each of the respective sub-periods; and
    adding the first sub-period integrated value and the second sub-period integrated value to cancel the interference residue of opposite polarity in the respective sub-periods, so as to generate a corrected integrated value for the integration time period.

2. The method of claim 1, wherein the symmetrical opposite polarities comprise positive and negative zero crossings of the down converted interferer signal.

3. The method of claim 1, further comprising down mixing the detected signal to obtain the down mixed CW interferer signal.

4. The method of claim 1, wherein, the first sub-period and the second sub-period are of equal size.

5. The method of claim 1, wherein the CW interferer signal has a frequency different than the carrier frequency and the down converted interferer signal has a frequency that is the difference between the carrier frequency and the CW interferer signal frequency.

6. The method of claim 1, wherein integration during the first sub-period and the second sub-period ends after a predetermined amount of time.

7. The method of claim 1, wherein the radar sensor system comprises an automotive radar system, and the CW interferer signal is transmitted from a second automotive radar system.

8. The method of claim 1, further comprising adjusting the integration in the respective sub-periods to a length of time equaling an integer number of down converted interferer signal cycles.

9. The method of claim 1, wherein the down converted interferer signal composes one of an in-phase (I) and quadrature (Q) signal of the radar sensor system.

10. The method of claim 1, wherein a comparator and a controllable switch are used to trigger integration of the detected signal.

11. A radar sensor system with continuous wave (CW) interference cancellation, comprising:
- a transmitter for emitting a transmission radar signal at a carrier frequency;
- a receiver configured to detect a signal including reflections of the emitted transmission radar signal and a CW interferer signal; and
- a controller and/or processor for processing signals associated with the radar sensor system, the controller and/or processor:
  (i) defining an integration time period, the radar sensor system being configured to integrate a detected signal during the integration time period;
  (ii) dividing the integration time period into a first sub-period and a second sub-period, the radar sensor system transmitting the transmission radar signal during the first sub-period and the second sub-period of the integration time period;
  (iii) integrating the detected signal during both the first sub-period and the second sub-period to generate respective sub-period integrated values, wherein integration in the first sub-period and second sub-period is triggered at points of symmetrical opposite polarities of a down converted interferer signal based on the CW interferer signal and having a non-integer number of cycles in each sub-period, resulting in interference residue in each of the respective sub-periods; and
  (iv) adding the first sub-period integrated value and the second sub-period integrated value to cancel the interference residue of opposite polarity in the respective sub-periods, so as to generate a corrected integrated value for the integration time period.

12. The system of claim 11, wherein the symmetrical opposite polarities comprise positive and negative zero crossings of the down converted interferer signal.

13. The system of claim 11, wherein the controller and/or processor down mix the detected signal to obtain the down mixed CW interferer signal.

14. The system of claim 11, wherein the first sub-period and the second sub-period are of equal size.

15. The system of claim 11, wherein the CW interferer signal has a frequency different than the carrier frequency and the down converted interferer signal has a frequency that is the difference between the carrier frequency and the CW interferer signal frequency.

16. The system of claim 11, wherein integration during the first sub-period and the second sub-period ends after a predetermined amount of time.

17. The system of claim 11, wherein the radar sensor system comprises an automotive radar system, and the CW interferer signal is transmitted from a second automotive radar system.

18. The system of claim 11, wherein the controller and/or processor adjust the integration in the respective sub-periods to a length of time equaling an integer number of down converted interferer signal cycles.

19. The system of claim 11, wherein the down converted interferer signal comprises one of an in-phase (I) and quadrature (Q) signal of the radar sensor system.

20. The system of claim 11, further comprising a comparator and a controllable switch configured to trigger integration of the detected signal.

* * * * *